United States Patent Office 2,868,743
Patented Jan. 13, 1959

2,868,743

METHOD OF IMPROVING COLOR IN PHENOL-ALDEHYDE RESINS BY ADDING A REDUCING SUGAR THERETO AND PRODUCT OBTAINED

David A. Feigley, Jr., Lancaster Township, Lancaster County, Pa., assignor to Armstrong Cork Company, Lancaster, Pa., a corporation of Pennsylvania No Drawing. Application March 9, 1956
Serial No. 570,424

19 Claims. (Cl. 260—17.2)

This invention relates generally to phenolic resins, and more particularly to phenol-aldehyde resins. Still more particularly, it relates to a method of improving the color of cured phenol-aldehyde resinous compositions. It also relates to the phenol-aldehyde compositions having improved color in the cured state.

Most commercial phenolic casting resins and molding resins develop a red-to-black color on cure. This color is objectionable since it can only be masked with dark pigments; light-colored products are impractical.

It is possible to prepare phenolic resins which on cure will not develop the objectionable color described above. By the use of stainless steel or nickel reaction vessels, by the use of exceedingly pure raw materials, by careful neutralization of the catalyst, and by careful control of the entire reaction to prevent contamination, a phenol-aldehyde curable composition can be prepared which will not develop the objectionable dark color on cure. Such resins are more costly than the usual commercial grades of resin, however; as a general rule, the lighter the color of the curable composition, the more costly is its manufacture. Thus, there is a definite need for an inexpensive and simple method of eliminating the objectionable dark color that results from the curing of the usual commercial phenol-aldehyde resins.

It is the primary object of the present invention to supply such a method. It is a further object of the present invention to supply an agent which will eliminate the objectionable dark color in cured commercial phenol-aldehyde resins in the form of film, cast, and molded products. It is also an object to supply an inexpensive commercial phenol-aldehyde composition which will cure to a light-colored product.

These objects are accomplished in a surprisingly effective and straightforward manner. The invention contemplates incorporating in a curable phenol-aldehyde composition an amount of reducing sugar effective in eliminating objectionable dark color on cure of the mixture without changing other properties of the resin. This amount is in the range of about 2%–7% by weight reducing sugar based on the weight of resin solids. The resulting mixture may then be cured and otherwise handled in the usual manner.

The phenol-aldehyde resins useful in the present invention are known items of commerce. They are prepared by the reaction of phenolic materials with aldehydes in the presence of either an acid or an alkaline catalyst, the type of catalyst used depending upon the product desired. The phenol used in the preparation of the phenol-aldehyde resins may be any of the nuclear hydroxy-substituted aromatic hydrocarbons containing carbon, hydrogen, and oxygen, and possibly other constituents, and includes phenol itself, cresol, xylenol, resorcinol, as well as the mixture of phenols known to the trade as cresylic acid. The aldehyde to be used includes any active aldehyde consisting solely of carbon, hydrogen, and oxygen which forms a condensation product with a phenol. Effective aldehydes are formaldehyde, acetaldehyde, propionaldehyde, butyraldehyde, furfuraldehyde, and others. Phenol itself is the phenol of choice, and formaldehyde is the aldehyde of choice.

Molding phenolics are usually prepared either by a one-stage or two-stage process. In the one-stage process, about 1.2 moles of formaldehyde is reacted with 1 mole of phenol in the presence of an alkaline or an acid catalyst by heating in a steam jacketed kettle. The most common catalysts are ammonia and potassium or sodium hydroxide, although amines, alkali carbonates may be used. The alkaline-catalyzed product is more common than the acid-catalyzed product. The time of reaction is dependent upon the type and amount of catalyst, proportion of formaldehyde, and temperature, and must be controlled to secure uniformity of product. After the reaction has progressed to the desired extent, water may be removed under vacuum and the resin discharged from the reaction vessel.

In the more common two-stage process, a fusible soluble resin is first formed by the reaction of formaldehyde and phenol in a manner similar to the one-stage process. The proportion of formaldehyde used is less than that required to produce an infusible resin; hence, the control of the reaction is much less critical. Acid catalysts are often used in this process and are subsequently neutralized. Ammonia and alkali catalysts may also be used, however. After dehydration, the treatment is similar to the one-stage process except that formaldehyde sufficient to cure the resin may be added along with fillers, pigments, and lubricants. The formaldehyde may be added in the form of hexamethylenetetramine or paraformaldehyde.

Casting resins are generally prepared by reacting 1:5 to 2.5 moles formaldehyde per mole of phenol with an alkaline catalyst in a reaction vessel at 70°–100° C. The time of reaction is dependent upon the conditions used, varying from about 15 minutes to about 3 hours. Viscosity measurements are often used as a control for the reaction. Water is removed under vacuum, leaving a viscous resin after neutralizing the catalyst with organic acids. The color may be water-white to deep red, depending on the character of the reaction vessel, the purity of the ingredients, and the care with which the reaction is run. The whiter resins are substantially more expensive than the darker.

Molding resins may be mixed on heated rolls at 200°–225° F. with fillers, pigments, and mold lubricants. Such treatment serves to bring about further condensation of the resin to a very viscous but still fusible state, and it is continued until the desired degree of plasticity is attained. The resin is then cooled in sheets and ground. It may then be sieved to uniform particle size. The molding powder is then used in ways well-known in the art.

Casting resins remain in the form of a liquid to which may be added plasticizers, glycerine to stabilize the moisture content, and mold lubricants, along with dyes and pigments. The resin may be poured in the preheated molds and converted to a solid by a slow cure below about 85° C. for a period of time of about 3 to 10 days.

The phenol-aldehyde resins contemplated for use in the present invention are any of those resins prepared along the lines described above which develop the usual objectionable dark color on cure.

As mentioned earlier, reducing sugars are the agents which eliminate the objectionable color in cured phenol-aldehyde resins. The reducing sugars are that class of sugars which reduce Fehling's solution. This includes all the monosaccharides and most of the disaccharides. Both the ketoses and the aldoses are operable. As examples of reducing sugars there may be mentioned dextrose (glucose), fructose (levulose), mannose, lactose, galactose, and mixtures of reducing sugars such as are found in invert sugar. This list is not exclusive, since the color-elimination phenomenon appears to be characteristic of the entire class of reducing sugars. In the class, some reducing sugars work better than others, but they are all operable. Generally speaking, the decision as to which reducing sugar to use in a given application will be dictated by availability, price, stability, and other characteristics of the individual sugars in the reducing sugar class.

The amount of reducing sugar to be added to the phenol-aldehyde composition is critical within the range of about 2%–7% by weight sugar based on the weight of total resin solids. Generally, it has been found that an amount of reducing sugar of about 1% by weight based on the weight of resin solids does not give practical color elimination under most circumstances; not until about 2% by weight, and preferably about 3% by weight of reducing sugar on resin solids has been added does color elimination become dramatic. The range of about 2%–4% by weight reducing sugar based on the total resin solids is the preferred range. Additional reducing sugar above about 4% by weight does no harm until the amount rises to about 7% by weight reducing sugar based on the total resin solids. Amounts of reducing sugar beyond 7% by weight leave an excess of reducing sugar in the final composition and thus destroy the normal physical properties of the resin. Hence, the preferred range of amount of reducing sugar is about 2%–7% by weight reducing sugar based on the total resin solids, and more preferably about 2%–4%.

It is preferred that the reducing sugar be incorporated in the phenolic resin while the latter is in water-soluble form. This aids in the dispersion of the reducing sugar throughout the resinous mass. Where the phenol-aldehyde resin is prepared under alkaline conditions, the reducing sugar may be introduced directly into the reaction vessel along with the phenol and the aldehyde reactants. When this method of addition is used, smaller amounts of the sugar may be added since the color-eliminating mechanism appears to operate more efficiently. Thus, the requisite reducing sugar will be present in the resinous mixture from the very beginning and the resin may henceforth be handled without further ado in the normal manner. If the phenol-aldehyde reaction is carried out under acid conditions, it is preferred that the reducing sugar be withheld until the acid catalyst is neutralized, after which the reducing sugar may be added as desired. The sugar may be added as such or it may be added in the form of a solution or suspension. Where the resin is to be handled as an anhydrous mass, it is preferred that the sugar be introduced prior to the removal of water. Where the resin is to be handled as an aqueous solution or suspension, the reducing sugar may be introduced into the solution at any time and in any convenient manner prior to cure.

A cure of the composition of the present invention will generally produce a yellow, straw-colored, clear, transparent solid. If the larger amounts of the reducing sugar are used beyond the maximum described herein, the resulting product will contain deposited crystals of reducing sugar which will render the product opaque and which weaken the product and otherwise destroy the desirable properties of the cured product. The straw color is of no disadvantage since it may easily be masked even with light pastel shades.

The mechanism by which reducing sugars substantially eliminate the objectionable dark color of cured phenol-aldehyde resins is not understood.

The following examples illustrate several embodiments of the invention. All parts are by weight unless otherwise stated.

Example I

An aqueous dark red solution containing 71.8% solids of a phenol-formaldehyde resin is the resole stage, having a pH of 7.7 and a viscosity of about 130 centipoises at 25° C. (Durez 16056), was poured into a Petri dish and placed overnight in an oven maintained at 195° F.

The resulting cured film was opaque and of blackish-red color.

Example II

To 20 parts of the resin solution of Example I was added 0.5 part dextrose and the mixture was stirred to dissolve the dextrose. No lightening of the deep red color of the resole was noted.

On curing overnight in Petri dish at 195° F., a clear, transparent, pale straw yellow film of cured phenolic resin resulted.

Example III

Example II was repeated save that 1 part of dextrose was added to the resole. After curing, a film identical with that in Example II was obtained; no further lightening of the color was noted.

When the run is repeated using 1 part invert sugar, the same results are obtained.

Example IV

Example II was repeated save there was used 0.5 part lactose in place of dextrose. On curing, a clear yellow film resulted which was of a deeper yellow color than that obtained in Example II.

Example V

Example II was repeated save that in place of the 0.5 part dextrose individual runs were made, each containing 0.5 part by weight of the following compounds, respectively:

Sodium bisulfite, hydroquinone, gluconic acid, formalin, paraformaldehyde, sodium lactate, a salt of ethylene diamine tetra-acetic acid, glutaraldehyde, and hydroxyadipaldehyde.

On curing each of these compositions as in Example II, a film resulted which was indistinguishable from that obtained in Example I; that is, the film was of a deep blackish-red color.

Example VI

Example II was repeated using a red monomeric resole, water-soluble, thermosetting A-stage phenol-formaldehyde resin (Varcum 3754). On the addition of 0.5 part dextrose, a clear, transparent, very light yellow film resulted.

A light straw yellow film was obtained when another red water-soluble thermosetting phenol-formaldehyde resin (Bakelite 15100) was used.

Example VII

Example II was repeated save that 0.5 part fructose was added to the resole. A clear, transparent straw yellow film of cured phenolic resin resulted.

The run was repeated save that 1 part fructose was added. A transparent, straw yellow slightly cloudy, cured film resulted.

Example VIII

To 63 parts of the resin solution used in Example I was added 1.89 parts dextrose. The water was removed from the solution by stirring at elevated temperature.

The remaining thick, viscous mixture weighing 45 parts was poured into a mold and heated for 5 hours at 210° F. under a pressure of about 320 pounds per square inch. On cooling, the resulting disc was removed and inspected.

The disc was white with a barely detectable tinge of yellowness.

A similar disc prepared from a mixture, identical with that described immediately above save that the dextrose was absent, was black in color.

Example IX

A series of discs was prepared as in Example VIII save that each disc contained, respectively, dextrose in an amount of 1%, 2%, 3%, 4%, 5%, 7%, 10%, 20%, 30%, 40% and 50% by weight based on the total resin solids.

All the resulting discs were basically white in color; the discs containing 1% and 2% dextrose possessed red tinting. Those discs containing more than 7% dextrose contained occasional dark areas which probably resulted from the degradation of the dextrose. The higher the amount of dextrose, the more frequent the discolored areas.

*Example X*

Into a round-bottom flask were placed 90 parts (1.0 mole) commercial phenol, 112.5 parts (1.5 moles) formaldehyde as a 40% solution in water, 0.041 part $BaOH \cdot 8H_2O$, and 0.64 part NaOH. The flask was placed in a boiling water-bath. In 30 minutes the temperature of the mixture reached 205°–210° F. The mixture was maintained at that temperature range for an additional two hours, and then removed from the bath.

A portion of the resulting reddish mixture was poured into a Petri dish and cured overnight at 195° F.

The resulting film was hard, tough, and smooth, and was a dark red-to-black color.

*Example XI*

Example X was repeated save that 4.8 parts dextrose was added to the mixture prior to heating the mixture on the water-bath.

On curing, the hard, tough, smooth film was of a light clear straw-yellow color.

*Example XII*

Example XI was repeated save that 27 parts of dextrose was added instead of the 4.8 parts of dextrose.

On curing, the film was yellow but opaque. The film was soft and sticky, and exuded sticky matter.

I claim:

1. The method of improving color of cured phenolic resins while preserving the normal physical properties of such resins, which comprises incorporating in a curable phenol-aldehyde composition an additive consisting essentially of reducing sugar in the range of about 2%–7% by weight based on the weight of total phenol-aldehyde solids and curing resulting mixture.

2. The method according to claim 1 wherein said reducing sugar is incorporated in said composition during the formation of said composition.

3. The method according to claim 1 wherein said reducing sugar is incorporated in said composition subsequent to the formation of said composition.

4. The method according to claim 1 wherein said reducing sugar comprises fructose.

5. The method according to claim 1 wherein said reducing sugar comprises dextrose.

6. The method according to claim 1 wherein said amount is in the range of 2%–4% by weight.

7. The method of forming a phenolic resin composition capable of curing to a light-colored product which comprises admixing an additive consisting essentially of 2%–7% by weight reducing sugar based on the weight of total resin solids with a curable phenol-aldehyde composition.

8. The method according to claim 7 wherein said reducing sugar comprises dextrose.

9. The method according to claim 7 wherein said reducing sugar comprises lactose.

10. The method according to claim 7 wherein said reducing sugar comprises fructose.

11. The method according to claim 7 wherein said reducing sugar is admixed in an amount of about 2%–4% by weight based on the weight of said phenol-aldehyde composition.

12. A composition of matter consisting essentially of a curable phenol-aldehyde composition and 2%–7% by weight of reducing sugar based on the weight of phenol-aldehyde solids.

13. A composition according to claim 12 wherein said reducing sugar is present in an amount of 2%–4% by weight of said phenol-aldehyde composition.

14. A composition of matter consisting essentially of a curable phenol-aldehyde composition and 2%–7% by weight dextrose based on the weight of phenol-aldehyde solids.

15. A cured composition of matter consisting essentially of a phenol-aldehyde resin and 2%–7% by weight of reducing sugar based on the weight of said resin.

16. A cured composition of matter consisting essentially of a phenol-aldehyde resin and 2%–7% by weight dextrose based on the weight of said resin.

17. A cured composition of matter consisting essentially of a phenol-aldehyde resin and 2%–7% by weight lactose based on the weight of said resin.

18. A cured composition of matter consisting essentially of a phenol-aldehyde resin and about 2%–4% by weight reducing sugar based on the weight of said resin.

19. A cured composition of matter consisting essentially of a phenol-aldehyde resin and 2%–4% by weight dextrose based on the weight of said resin.

References Cited in the file of this patent

UNITED STATES PATENTS

| | | |
|---|---|---|
| 2,362,086 | Myers et al. | Nov. 7, 1944 |
| 2,728,741 | Simon et al. | Dec. 27, 1955 |